July 2, 1963  J. MARTIN  3,095,893
EMERGENCY WATER STORAGE TANK SYSTEM FOR USE IN BUILDINGS
Filed June 8, 1959
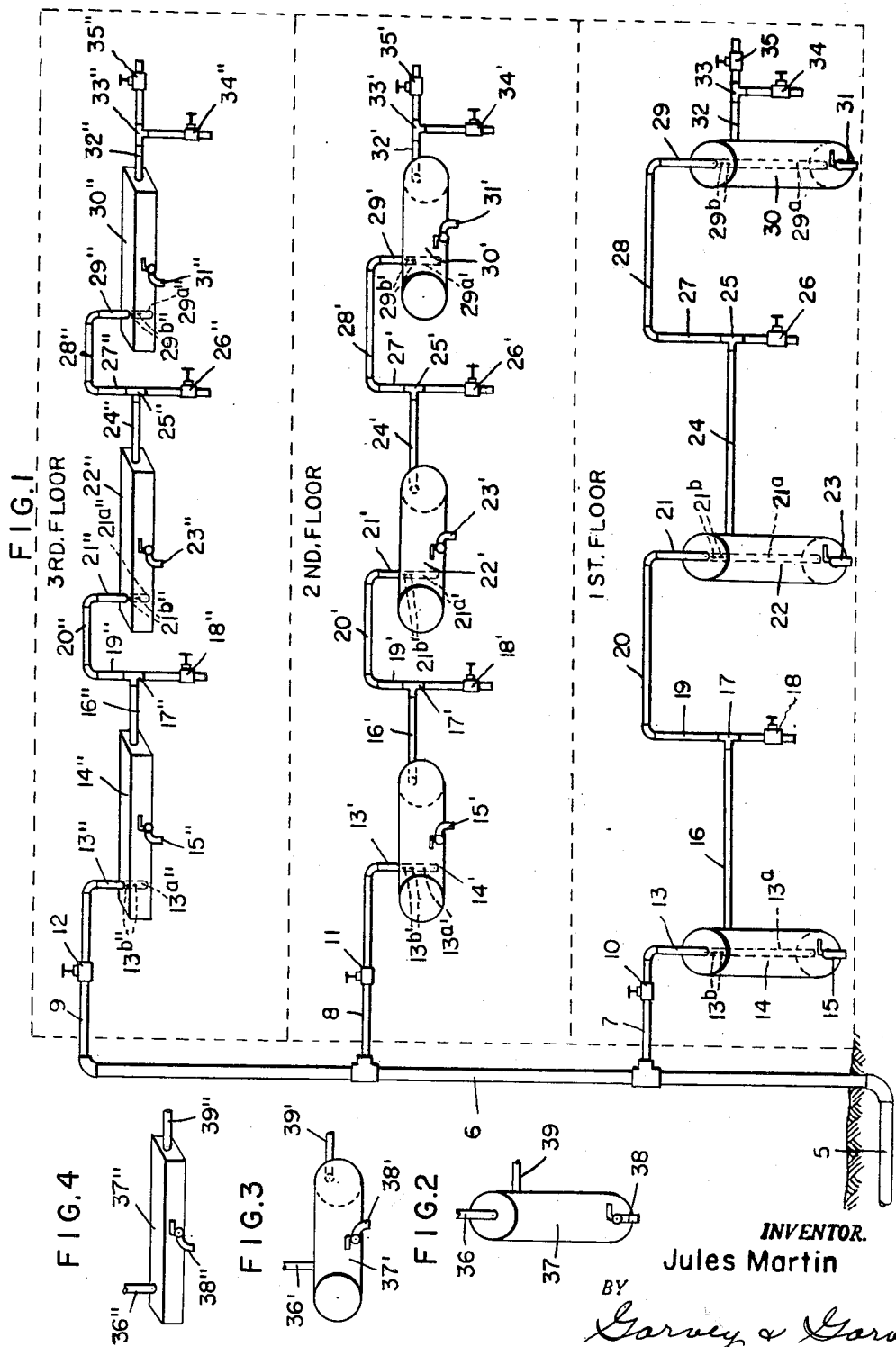
INVENTOR.
Jules Martin
BY
Garvey & Garvey
ATTYS 3,095,893
EMERGENCY WATER STORAGE TANK SYSTEM
FOR USE IN BUILDINGS
Jules Martin, 525 Kunawai Lane, Honolulu, Hawaii
Filed June 8, 1959, Ser. No. 818,667
4 Claims. (Cl. 137—216)

This invention relates to an emergency water storage tank system particularly adapted for use in buildings, and is a continuation-in-part of application, S.N. 776,063, filed by me November 24, 1958, now abandoned.

It is an object of this invention to provide an emergency water storage tank system designed for installation in homes, schools, factories, etc., to provide a ready supply of fresh water in the event that the water supply is temporarily cut off or there is a disaster.

Further objects are to provide an emergency water storage tank system including one or more storage tanks which are interposed between the water supply conduit and the plumbing facilities to automatically insure the maintenance of fresh water in all the tanks at all times; to provide a system of emergency water storage tanks which may be located on different floors of a building to evenly distribute an emergency water supply throughout; and to provide a system of the character described in which each tank includes an inlet line and an outlet line connected with the water feed line, means being strategically connected to the tank for drawing the water therefrom when needed.

Other objects of the invention will be manifest from the following description of the present preferred forms of the invention, taken in connection with the accompanying drawing, wherein:

FIG. 1 is a schematic view illustrating a preferred form of the present water tank system installation in a building;

FIG. 2 is a fragmentary schematic view showing a modified form of water tank;

FIG. 3 is a fragmentary schematic view illustrating a second modified form of water tank; and FIG. 4 is a fragmentary schematic view illustrating a third modified form of water tank.

Referring now in greater detail to the drawing, the water storage tank system of the present invention is schematically shown in FIG. 1 installed in a three-story building, the storage tanks being shown in their various shapes and positions which they may assume. In this form of the invention the emergency water tank system employs tanks having a capacity in excess of 30 gallons, or water tanks of lesser capacity, where water pressure is low.

A subterranean water main is indicated at 5 to which is connected an upwardly extending service pipe 6 from which distribution pipes 7, 8 and 9 branch off to serve the plumbing facilities on the three floors of the building. Intermediate their lengths, distribution pipes 7, 8 and 9 are provided with shut-off valves 10, 11 and 12, respectively, for purposes which will be hereinafter more fully set out.

The first-floor emergency water storage tank system includes a tank inlet pipe 13 which extends downwardly from the free terminal of a distribution pipe 7 into communication with a water tank 14, a portion of the pipe 13a extending into the tank to a point adjacent the bottom thereof. Near the upper limit of tank 14, pipe 13a is provided with a pair of air holes 13b which serve to prevent the siphoning of water from the tank, in the event a water main becomes broken. A spigot or the like 15 is connected to the side of tank 14 near its lower edge for drawing water from the tank, when needed. An outlet pipe 16 is connected to the side of tank 14 proximate its upper limit, through which the water flows from the tank. A T-connection 17 is joined to the free end of outlet pipe 16 for directing the water downwardly to a service outlet 18 and upwardly through a conduit 19 to a feed line 20. Feed line 20 is in turn connected to a second tank inlet pipe 21 in communication with the upper end of a vertically disposed water storage supply tank 22. Pipe 21 extends into tank 22 to a point adjacent the bottom thereof, as indicated at 21a, the upper end of said extended pipe portion being provided with a pair of air holes 21b. Tank 22 is of the same construction as tank 14 and has a spigot 23 and an outlet pipe 24. A second T-connection 25 directs water downwardly to a service outlet 26 and upwardly through a conduit 27 to a second feed line 28. A third tank inlet pipe 29 is connected at one end to feed line 28, the opposite end thereof being in communication with a third storage tank 30 similar to tanks 14 and 22. Inlet pipe 29 likewise includes a portion 29a having air holes 29b within tank 30. Tank 30 is likewise provided with a spigot 31 and an outlet pipe 32 which is in communication with a T-connection 33. Connection 33 is so placed in the outlet pipe that it directs the water downwardly to a third service outlet 34 and laterally to a second shut-off valve 35 adapted to be operated in conjunction with shut-off valve 10.

The second-floor emergency storage tank system is substantially the same as that described above in connection with the first-floor emergency water storage tank system and, consequently, like parts have been designated by like primed numbers. It will be noted that, in accordance with this system, the storage tanks are again of cylindrical shape. However, instead of being vertically positioned with respect to their longitudinal axis, they are horizontally arranged. Consequently, inlet pipe 13' communicates with the side of tank 14', as does spigot 15'. Outlet pipe 16' is connected to one end of tank 14' proximate the upper limit of the tank. This same relationship exists with respect to the inlet and outlet pipes and spigots of tanks 22' and 30'.

The third-floor emergency water storage tank system is also similar to that of the first-floor system and like parts have accordingly been designated by double prime numbers. In this system water tanks 14", 22" and 30" are of rectangular cross-section and are horizontally disposed with respect to their longitudinal axis so that pipes 13", 21" and 29" each extend through the top of their respective tanks, spigots 15", 23" and 31" are connected to the sides and outlet pipes 16", 24" and 32" are connected to the ends of their respective tanks.

In normal usage, water is fed by the main 5 through service pipe 6 into distribution pipes 7, 8 and 9 whereupon it flows into the first tank on each floor, 14, 14' and 14". The location of the outlet pipes 16, 16' and 16" is such that water will not flow therethrough until the tanks 14, 14' and 14" are filled. This is likewise true with respect to tanks 22, 22', 22" and tanks 30, 30' and 30". By this arrangement of parts, the water storage supply tanks are always "full." The tanks are strategically located directly in the water supply line, and the water is delivered through the inlet pipe extensions to the bottom of the storage tanks. This forces the water already in each tank upwardly to its outlet pipe, thereby providing an automatic and constant supply of fresh water. There is, consequently, no need for periodic replacement of water in the tanks.

In the event of emergency, the shut-off valves for each floor, 10 and 35, 11 and 35', and 12 and 35", are closed to isolate the emergency water supply. Then, by opening the service outlets on each floor, air will be admitted to the storage tanks to permit the water to flow freely from the tank spigots. It will also be apparent from the drawing that, for emergency use, each water tank is an independent unit so that if the pipe lines are damaged or if one or more tanks is damaged or destroyed, the remaining tanks are unaffected.

In FIGS. 2, 3 and 4, there are shown modified forms of water storage tanks, which are designated 37, 37' and 37", and which are similar in construction and arrangement to tanks 14, 14' and 14" in the form of invention illustrated in FIG. 1. In these modified forms, however, inlet pipes 36, 36' and 36" do not extend into the water tanks, but only to their upper limit. This arrangement is adapted for use with tanks having a capacity of 30 gallons or under when connected to a plumbing system employing three-fourths of an inch and one inch pipes receiving water from the water main with approximately sixty-pound pressure. Under these conditions, the water entering the tanks will create sufficient turbulence for proper circulation in the tank, so that the water remains fresh at all times. The location and operation of spigots 38, 38' and 38" and outlet pipes 39, 39' and 39" remain the same as in the main form of the invention, illustrated in FIG. 1.

The emergency water storage tank system of the present invention is adapted for installation in all types of buildings, including homes, schools, factories, hotels, hospitals and government buildings. The use of this system on the various floors of buildings insures an even distribution of an emergency water supply and, correspondingly, the installation of this system in buildings throughout a town or city establishes an evenly distributed supply of water in the town or city, in case of disaster.

It is, of course, to be understood that the size of the tanks employed in a particular building will depend on its needs and the types of tanks used on each floor will not necessarily be as shown and described herein, but will depend on the location in which the tanks are placed. Various other changes may be made within the scope of the claims hereto appended.

What I claim is:

1. In a building equipped with plumbing facilities, an emergency distributing system including a water distribution pipe, a plurality of water storage tanks having inlet and outlet pipes connected in series, the inlet pipe of the first of said water storage tanks being connected to the water distribution pipe and the outlet pipes of said water storage tanks being connected to the plumbing facilities to permit passage of water from said water distribution pipe through the storage tanks before emptying into the plumbing facilities, each inlet pipe being connected to the top of each water storage tank and extending into the tank to a point proximate the lower limit of the tank, that portion of the pipe within the tank being provided with air holes to prevent the siphoning of water therefrom in the event that the water distribution pipe is broken, each outlet pipe being connected to a side wall of the tank near its upper extremity and being joined to a T-connection, one branch of said T-connection being in communiation with the inlet pipe of an adjacent tank, the other branch of said T-connection being in communication with one of the plumbing facilities, and a shut-off valve in the other branch of each T-connection, to isolate said water storage tanks from the plumbing facilities, means connected to the storage tanks adjacent their lower extremities for drawing off water therefrom, and shut off valves in the inlet pipe of said first tank and in the outlet pipe of the last tank to isolate the series of tanks.

2. In a building equipped with plumbing facilities, an emergency water distributing system including a water distribution pipe, a plurality of water storage tanks having inlet and outlet pipes connected in series, said inlet and outlet pipes being located proximate the upper extremities of the tanks, the inlet pipe of the first of said water storage tanks connected to the water distribution pipe and the outlet pipes of said water storage tanks being connected to the plumbing facilities to permit passage of water from said water distribution pipe through the storage tanks before emptying into the plumbing facilities, the inlet pipe of each of said tanks being extended into the tank to a point proximate the lower limit thereof to deliver fresh water to the bottom of the tank remote from the outlet pipe and create turbulence of the water in the tank, the extended portion of each inlet pipe being provided with air holes to prevent the siphoning of water therefrom in the event that the water distribution pipe is broken, and means connected to the storage tanks adjacent their lower extremities for drawing off water therefrom.

3. In a multi-story building equipped with plumbing facilities on each floor, an emergency water distributing system including a service pipe, a water distribution pipe on each floor in communication with said service pipe, a plurality of water storage tanks connected in series to each other and to a water distribution pipe, a water inlet pipe connected to the top of each water tank and extending into the tank to a point proximate the lower limit of the tank, that portion of the pipe within each tank being provided with air holes to prevent the siphoning of water therefrom in the event that the water distribution pipe is broken, a water outlet pipe connected to a side wall of each tank near its upper extremity, the inlet pipe of the first of said water storage tanks on each floor being connected to the water distribution pipes, and the outlet pipes of said water storage tanks being connected to the plumbing facilities, to permit normal passage of water from said water distribution pipe through the storage tanks before emptying into the plumbing facilities, and means connected to each of said storage tanks adjacent their lower extremities for drawing off water therefrom.

4. The emergency water distributing system of claim 3 with the addition of pairs of shut-off valves on each floor, one of said valves being located in the inlet pipe of the first of said series of tanks, and the other of said valves being located in the outlet pipe of the last of said series of tanks to isolate each series of storage tanks.

References Cited in the file of this patent

UNITED STATES PATENTS

| 269,156 | Campbell | Dec. 12, 1882 |
| 304,379 | Wade | Sept. 2, 1884 |
| 581,330 | Brady | Apr. 27, 1897 |
| 758,188 | Miller | Apr. 26, 1904 |
| 920,558 | Fleming | May 4, 1909 |
| 995,930 | Walker | June 20, 1911 |
| 1,150,269 | Heulings | Aug. 17, 1915 |
| 1,698,342 | McGill | Jan. 8, 1929 |
| 2,273,174 | Brooks | Feb. 17, 1942 |
| 2,281,057 | Von Phul | Apr. 28, 1942 |
| 2,294,163 | Donnelly | Aug. 25, 1942 |
| 2,931,382 | Cirillo | Apr. 5, 1960 |

OTHER REFERENCES

Federal Civil Defense Administration pamphlet "Home Protection Exercises" (revised edition June 1956). Documents, U.S. Government Printing Office, Washington 25, D.C.—Price 15¢.)